(12) United States Patent
Kim et al.

(10) Patent No.: US 10,123,150 B2
(45) Date of Patent: Nov. 6, 2018

(54) GAME STREAMING WITH SPATIAL AUDIO

(71) Applicant: Microsoft Technology Licensing, LLC, Redmond, WA (US)

(72) Inventors: Ryan Y. Kim, Bellevue, WA (US); Todd R. Manion, Seattle, WA (US); Robert N. Heitkamp, Sammamish, WA (US); Steven Wilssens, Kenmore, WA (US); Philip A. Edry, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/420,840

(22) Filed: Jan. 31, 2017

(65) Prior Publication Data

US 2018/0220255 A1 Aug. 2, 2018

(51) Int. Cl.
*H04R 5/02* (2006.01)
*H04S 7/00* (2006.01)
*G10L 19/16* (2013.01)
*A63F 13/28* (2014.01)
*H04H 40/81* (2008.01)

(52) U.S. Cl.
CPC ............. *H04S 7/308* (2013.01); *A63F 13/28* (2014.09); *G10L 19/167* (2013.01); *H04S 2400/11* (2013.01); *H04S 2420/01* (2013.01); *H04S 2420/11* (2013.01)

(58) Field of Classification Search
CPC ...... H04S 2400/11; H04S 3/008; H04S 7/308; H04S 2420/01; H04S 7/40; H04S 2420/11; G06F 3/011; G06F 3/16; G06F 3/162; G06F 1/3215; H04R 2420/07; A63F 13/28; G10L 19/167
USPC ...... 381/11, 12, 300, 303, 306–307, 309, 56, 381/58–59, 81, 85, 99–100; 345/633; 463/33
See application file for complete search history.

(56) References Cited

U.S. PATENT DOCUMENTS

| | | | |
|---|---|---|---|
| 6,611,603 B1 * | 8/2003 | Norris | H04R 5/00 381/309 |
| 7,719,563 B2 | 5/2010 | Richards | |
| 9,032,465 B2 | 5/2015 | Perlman et al. | |
| 9,215,575 B2 | 12/2015 | Kouhi | |

(Continued)

OTHER PUBLICATIONS

"Boom", http://boom.tv/landing, Retrieved on: Dec. 12, 2016, 4 pages.

(Continued)

*Primary Examiner* — Norman Yu
(74) *Attorney, Agent, or Firm* — Han Gim; Scott Y. Shigeta; Newport IP, LLC

(57) ABSTRACT

A game engine may generate video and audio content on a per-frame basis. Audio data corresponding to a current frame may be generated to comprise sound-field information independent of a speaker configuration or spatialization technology that may be used to play the associated audio. The sound-field may be generated based on monaural audio data corresponding to a sound produced by an in-game object at the object's position as of the current frame. The sound-field information may be transmitted to a remote computing device for reproduction using a selected, available speaker configuration and spatialization technology.

20 Claims, 8 Drawing Sheets

(56) References Cited

U.S. PATENT DOCUMENTS

| | | | |
|---|---|---|---|
| 9,452,354 B2 | 9/2016 | Rimon | |
| 2014/0094302 A1 | 4/2014 | Wilkiewicz et al. | |
| 2014/0350944 A1 | 11/2014 | Jot et al. | |
| 2015/0045922 A1* | 2/2015 | Beckhardt | G06F 3/165 700/94 |
| 2015/0131966 A1 | 5/2015 | Zurek et al. | |
| 2015/0223002 A1 | 8/2015 | Mehta et al. | |
| 2017/0208417 A1* | 7/2017 | Thakur | H04S 7/306 |

OTHER PUBLICATIONS

"SLIVER.tv Launches VR Live Cast and Live Replay Platform to Stream Top eSports Tournaments in 360 Virtual Reality", http://www.gamasutra.com/view/pressreleases/287112/SLIVERtv_Launches_VR_Live_Cast_and_Live_Replay_Plafform_toStream_Top_eSports_Tournaments_in_360_Virtual_Reality.php, Published on: Dec. 7, 2016, 2 pages.

Hitchman, Matthew, "Facebook 360: spatial workstation", https://fb360spatialworkstation.zendesk.com/hc/en-us/articles/207887969-Spatial-Workstation-Workflow, Retrieved on: Dec. 12, 2016, 2 pages.

Riegler, et al., "VideoJot: A Multifunctional Video Annotation Tool", in Proceedings of International Conference on Multimedia Retrieval, Apr. 1, 2014, 4 pages.

Perez, Sarah, "TC: YouTube rolls out support for 360-degree live streams and spatial audio", https://techcrunch.com/2016/04/18/youtube-rolls-out-support-for-360-degree-live-streams-and-spatial-audio/, Published on: Apr. 18, 2016, 7 pages.

"Scene Based Audio: A novel Paradigm for Immersive and Interactive Audio User Expreience", in Whitepaper of Qualcomm Technologies, Inc, Dec. 12, 2016, 21 pages.

Deo, et al., "Experiments in spatial mobile audio-conferencing", in Proceedings of the 4th international conference on mobile technology, applications, and systems, Sep. 10, 2007, pp. 447-451.

Buffoni, Louis-Xavier, "Ambisonics as an Intermediate Spatial Representation (for VR)", Retrieved from https://blog.audiokinetic.com/ambisonics-as-an-intermediate-spatial-representation-for-vr/, Aug. 2, 2016, 6 Pages.

Gurevich, et al., "Ambisonic Spatialization for Networked Music Performance", The 17th International Conference on Auditory Display, Jun. 24, 2011, 8 Pages.

Malham, et al., "3-D Sound Spatialization using Ambisonic Techniques", in Computer Music Journal, vol. 19, Issue 4, Dec. 1, 1995, pp. 58-70.

"International Search Report and Written Opinion Issued in PCT Application No. PCT/US2018/014608", dated May 7, 2018, 14 Pages.

* cited by examiner

GAME STREAMING WITH SPATIAL AUDIO

TECHNICAL FIELD

This disclosure relates generally to the streaming of computer-generated audio content.

BACKGROUND

Typically, audio for videogames and other computer-generated content is generated to be compatible with an audio reproduction device that is in-use by the immediate consumer of the content. For example, if a videogame player has connected a pair of headphones to his computer in order to play a videogame, the audio will typically be generated in a format that is directly compatible with the headphones, such as two-channel audio.

Increasingly, generated content such as videogames is not only reproduced locally, but is also streamed to remote computing devices. Generated content may, for example, be presented to various consumers other than the player of the videogame. These consumers may utilize a diverse set of audio equipment, including equipment that supports three-dimensional audio spatialization. In some instances, the audio capabilities available to a consumer may exceed those available to the player.

SUMMARY

The present disclosure relates generally to the streaming of computer-generated content. More particularly, the present disclosure describes techniques related to streaming spatial audio to systems and devices other than those on which the content was generated.

In an example embodiment, a game engine may generate audio data associated with a frame of videogame content. The audio data may be generated and provided for reproduction as sound-field data that is independent of speaker configuration or available spatialization technologies used to generate sound corresponding to the audio data. The audio data may therefore be generated independently of, or without cognizance of, the particular spatialization technologies or speaker configurations that may be available when the audio is reproduced. Compared to conventional approaches to generating content, this enables a recipient of streamed content to utilize the best available spatialization technologies, even when those technologies were not available at the source.

In the example embodiment, an audio platform module may receive the audio data comprising the sound-field information. The audio platform module may receive configuration information for a locally available audio reproduction device. Next, the audio platform module may generate a first audio signal that is compatible with a selected and locally available spatialization technology and speaker configuration. The audio platform module may then transmit the audio signal the device for audio reproduction.

In the example embodiment, the audio data may be sent to a remote computing device. Using the sound-field information in the audio data, the remote computing device may identify available spatialization technologies and speaker configurations. The remote computing device may generate a second audio signal that is compatible with an available spatialization technology and speaker configuration, based on the sound-field information.

In a further aspect of the example embodiment, the sound-field information is generated by converting a monaural source corresponding to an in-game object. The generation of the sound-field information is further based on a position and direction of the in-game object. One or more reverb channels are summed into the signal to provide directional information. A bank of coefficients is identified and applied to the signal to convert the monaural signal to sound-field data. The sound-field data may be subsequently transcoded to a spatialization technology, such as DOLBY ATMOS, using the embedded directional information.

In an embodiment, a game engine may process a frame of content. A game object may be associated with the content. The game object may be associated with a position, which may be updated per-frame. The game object may be associated with a sound.

In the embodiment, monaural audio data is generated to correspond to the sound. Position data for the object is received. Sound-field data is generated based on the monaural data and the position of the object. In some instances, the sound-field data is also based in part on combining one or more feedback channels to provide directional information. In a further aspect of the embodiment, the audio data is sent to a remote computing device and converted to a spatialization format that is compatible with the audio reproduction capabilities of the remote computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present disclosure will be described more fully hereinafter with reference to the accompanying drawings, in which.

DETAILED DESCRIPTION OF ILLUSTRATIVE EMBODIMENTS

Figure 1:
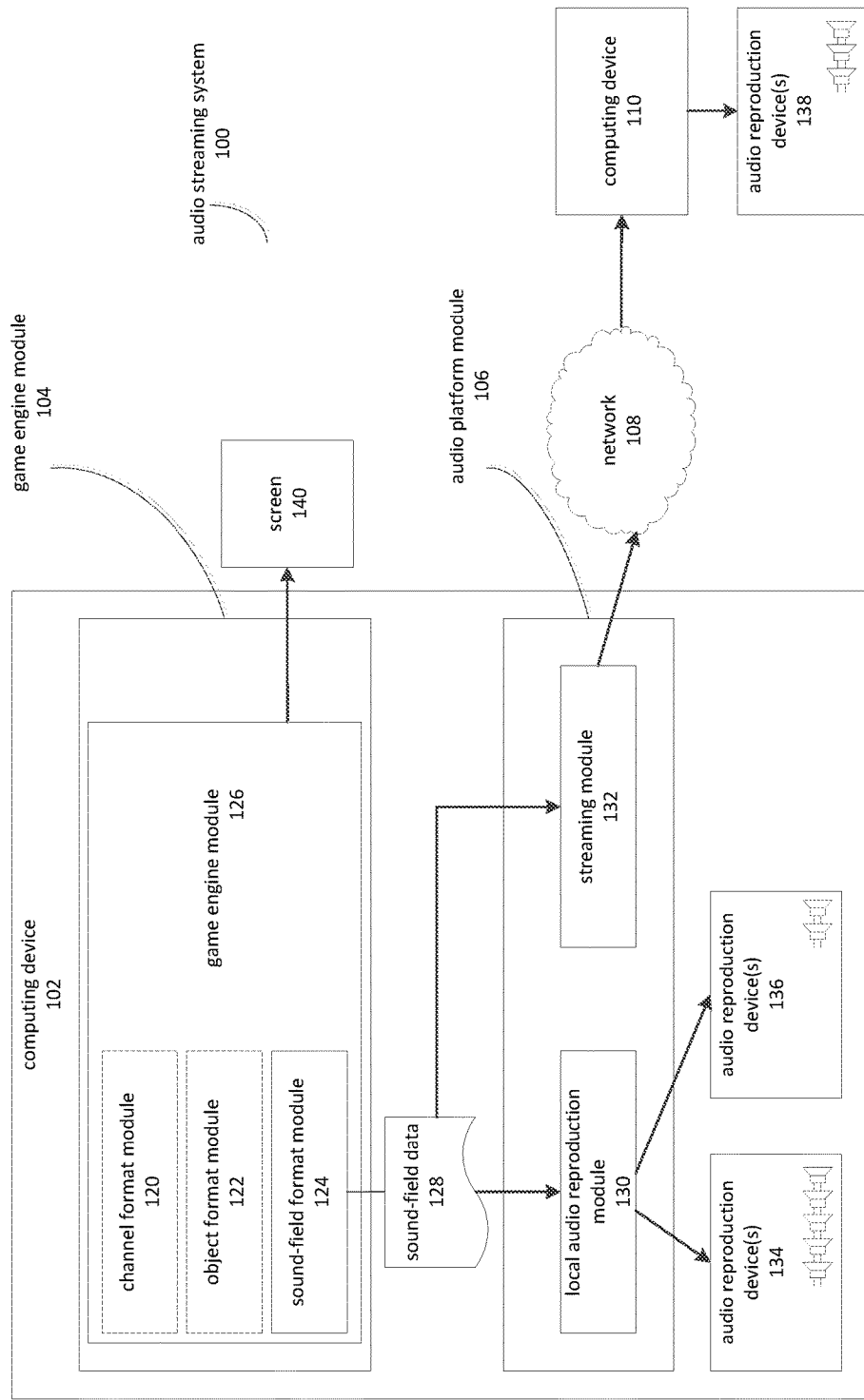
FIG. 1 depicts an example embodiment of an audio streaming system.

In an embodiment, audio data is generated to comprise sound-field information that is independent of a speaker configuration or spatialization technology that may be used to play the audio. The sound-field information may be used locally to generate audio using a selected and available speaker configuration and spatialization technology. The sound-field information may also be sent to a remote computing device via a network and/or game streaming platform, where it may be played (typically along with video content) for another user. The sound-field information may be used to generate audio compatible with the speaker configuration and spatialization technologies available to the remote computing device.

In an embodiment, the sound-field information may also be used to support multiple speaker configurations and spatialization technologies. For example, the sound-field information may be used to generate two audio signals, where each audio signal is further processed by applying a head-related transfer function ("HRTF") adapted to a particular listener. Conventional approaches to applying HRTFs may do so in a manner that prevents customizations for more than one listener.

In an embodiment, a game engine generates audio data to comprise sound-field information. The audio data may be generated per-frame, such that the sound-field information will reflect the positions and directions of sound-producing objects within the game. A frame may refer to a cycle of processing performed by a game engine. Each cycle may comprise steps such as calculating the current positions of various in game objects, determining whether the updated positions cause any in-game effects, generating video based on the in-game objects and their respective positions, and generating audio data associated with sound-producing game objects or in-game effects. For example, a collision between two game objects might produce a sound at the in-game location of the collision.

The game engine may repeat these cycles many times per second. The frequency with which frames are recalculated is sometimes referred to as a frame rate. The frame rates of a game engine may vary considerably, but may for example be anywhere from 15 to 120 frames per second. Generally speaking, higher frame rates are preferable.

The locations of any sound-producing objects or in-game effects might vary each frame. For example, a game object representing a car might move through the in-game environment. As it does, so too does the position of the sound it generates.

In many instances, it is desirable for the sounds produced within the game to be perceived by the player to be coming from the same location as the in-game object, relative to the player's reference point. For example, in the game's virtual environment a car might be positioned to the right of a character representing the player within the game. The sounds made by the car should, preferably, be perceived by the player to also be coming from the right. The same may be true in streaming scenarios where the consumer of the stream views the content from the same perspective as the original player.

Various techniques have been employed to play audio such that the listener will perceive a sense of position and direction. In the case of generated content such as videogames, it may be desired for the listener to be able to perceive the position and direction of various objects and in-game effects. Traditional 2-channel audio produces a spatialization effect by using left and right speaker channels. Variations of 2-channel audio may improve this effect by adding additional channels, as is the case with 5.1 and 7.1 speaker configurations and surround sound. More recently, other techniques such as DOLBY ATMOS and DTS:X have been developed. These techniques may be described as being object-based, rather than channel-based, because they use formats that represent the sounds produced by various objects. While channel-based formats are mixed a production time into one of various channel formats (e.g., stereo, 5.1, or 7.1), object-based formats defer this step to the time of reproduction, and as such are able to adjust to whatever speaker configuration is available at the time.

Embodiments may generate and distribute audio data using a sound-field representation. A sound-field representation may represent sound pressure levels at various points within a n-dimensional space. One example, not intended to be limiting, is ambisonics, in which sound field data may be represented in "a-format," "b-format," or various other higher-order formats. The "a-format" typically corresponds to data as collected by a sound field microphone array. The "b-format" may be derived from "a-format" data, and may consist of for signals or channels, W, X, Y, and Z. The W signal represents an omnidirectional microphone, while the X, Y, and Z signals represent directional components in three dimensions. In some embodiments, spherical harmonics are used in sound-field representation.

FIG. 1 depicts an example embodiment of an audio streaming system. An audio streaming system 100 may comprise a computing device 102 on which game content is generated. The game content may include visual components for reproduction on a screen 140, and audio components that are generated for reproduction on one or more local audio reproduction device(s) 134, 136, and streamed to a remote computing device 110 for reproduction on one or more remote audio reproduction device(s) 138. As depicted, each of the audio reproduction devices, local and remote, 134-138, may have alternative speaker configurations and support for spatialization technologies.

The game engine module 126 may support various spatialization technologies. In embodiments, these may include support for channel-based spatialization via a channel format module 120, support for object-based spatialization via an object format module 122, and support for sound-field spatialization via a sound-field format module 124. The channel format module 120, object format module 122, and sound-field format module 124 may be components of, or integrated into, the game engine module 126 and may output audio data corresponding to a current frame of the content being generated by the game engine module 126.

In an embodiment, the game engine module 126 may generate audio data that is represented only using sound-field format. In other words, the audio data associated with a given frame may, in an embodiment, not include any channel-based or object-based representations of sounds associated with the frame, and may thus exclusively include sound-field representations of sounds associated with the frame. Sound-field data may, for example, be generated for each frame of content based on factors such as the position and speed of objects represented by the generated content, the position and configuration of a virtual microphone array, and so forth.

In another embodiment, the game engine module 126 may generate audio data represented using a sound-field format, and additionally generate audio data in an additional format, such as a channel-based format or an object-based format. Thus, each frame of content may be associated with a corresponding frame of sound-field data and a corresponding frame of channel-based and/or object-based data.

In another embodiment, the game engine module 126 may generate sufficient information to permit the audio platform module 106 to product the sound-field data. For example, the game engine module 126 may generate audio data in object-format, and the audio platform module 106 might then convert the object-format data to sound-field data. Thus, with reference to FIG. 1, in some embodiments the sound-field format module 124 might be a component of the audio platform module 106, and adapted to perform conversion or transcoding of audio data in other formats to sound-field data 128.

The game engine module 126 may, in various embodiments, form audio data in a format selected to provide optimized spatialization to local and remote listeners. In some embodiments, this may comprise forming audio data initially in a first format and transcoding, prior to streaming, the audio data to a sound-field format. In some cases, such as when a locally available audio reproduction format has relatively poor spatialization support, the game engine may generate the local format and additional data that permits the local format to be converted to a sound-field representation.

The sound-field data 128 may be provided to an audio platform module 106. The audio platform module 106 may receive the sound field data 128 and cause the data 128 to be processed by a local audio reproduction module 130 and a streaming module 132.

The local audio reproduction module 130 may interface with one or more audio reproduction devices(s) 134, 136. As depicted by FIG. 1, each audio reproduction device 134, 136 may reproduce audio using different speaker configurations and spatialization technologies. For example, a first audio reproduction device 134 might be a 5.1 or 7.1 surround sound system, employing channel-based spatialization technology. A second audio reproduction device 136 might use HRTFs to provide personalized spatial audio. Other examples include televisions, virtual reality devices, and so on. In an embodiment, the audio platform module 106 may receive configuration information for the available audio reproduction devices and determine, in conjunction with the game engine module 126, an audio format for audio data generated by the game engine module 126. The audio format may be selected to permit maximized spatialization on a local audio devices and, through transmission of sound-field data, maximized spatialization on a remote audio device. In some embodiments, the sound-field data may be generated directly by the game engine module 126, while in other embodiments the sound-field data might be transcoded from another format of audio data generated by the game engine module 126. In this latter case, the game engine module 126 and audio platform module 106 might exchange additional information sufficient to transcode the audio data to sound-field format.

The streaming module 132 may send the sound-field data 128 to a remote computing device 110, for reproduction of the audio data on one or more of the audio reproductions device(s) 138 associated with the remote computing device 110. As with the local audio reproduction device(s) 134-136, the remote audio reproduction device(s) 138 may employ a variety of speaker configurations and spatialization technologies. These may diverge from those supported by the local audio reproduction device(s) 134-136. For example, the local device(s) 134-136 might support only channel-based audio, while the remote audio reproduction device(s) 138 might support sound reproduction using an object-based audio format, such as DOLBY ATMOS or DTS:X. In an embodiment, the computing device 110 may convert the streamed sound-field data 128 to the format(s) compatible with the audio reproduction device(s) 138.

In some instances, the local computing device 102 and the remote computing device 110 may have different processing capabilities, licensing, and other factors which permit only specific audio reproduction capabilities. For example, the local computing device 102 might be a customized gaming device with DOLBY ATMOS software and licensing, while the remote computing device 110 might be a mobile phone that supports 2-channel audio but not DOLBY ATMOS. In some instances, the remote computing device 110 might support an alternative spatialization technology, such as DTS:X or an HRTF.

By generating the sound-field data in the game engine module 126 (and/or transcoding by the audio platform module 106) and streaming of the sound-field data to the computing device 110, the computing device 110 and audio reproduction device(s) 138 are able to provide an optimized listening experience at the remote site, even when the local audio reproduction device(s) 134-136 use a less capable format. For example, the local audio reproduction device(s) 134-136 might use only 2-channel audio, while the remote audio reproduction device(s) might employ a full array of DOLBY ATMOS speakers. The use of sound-field data may permit each computing device 102, 110 and audio reproduction device 134-138 to use a divergent spatialization technology, regardless of what the other computing devices 102, 110 or audio reproduction device 134-138 are using.

Figure 2:
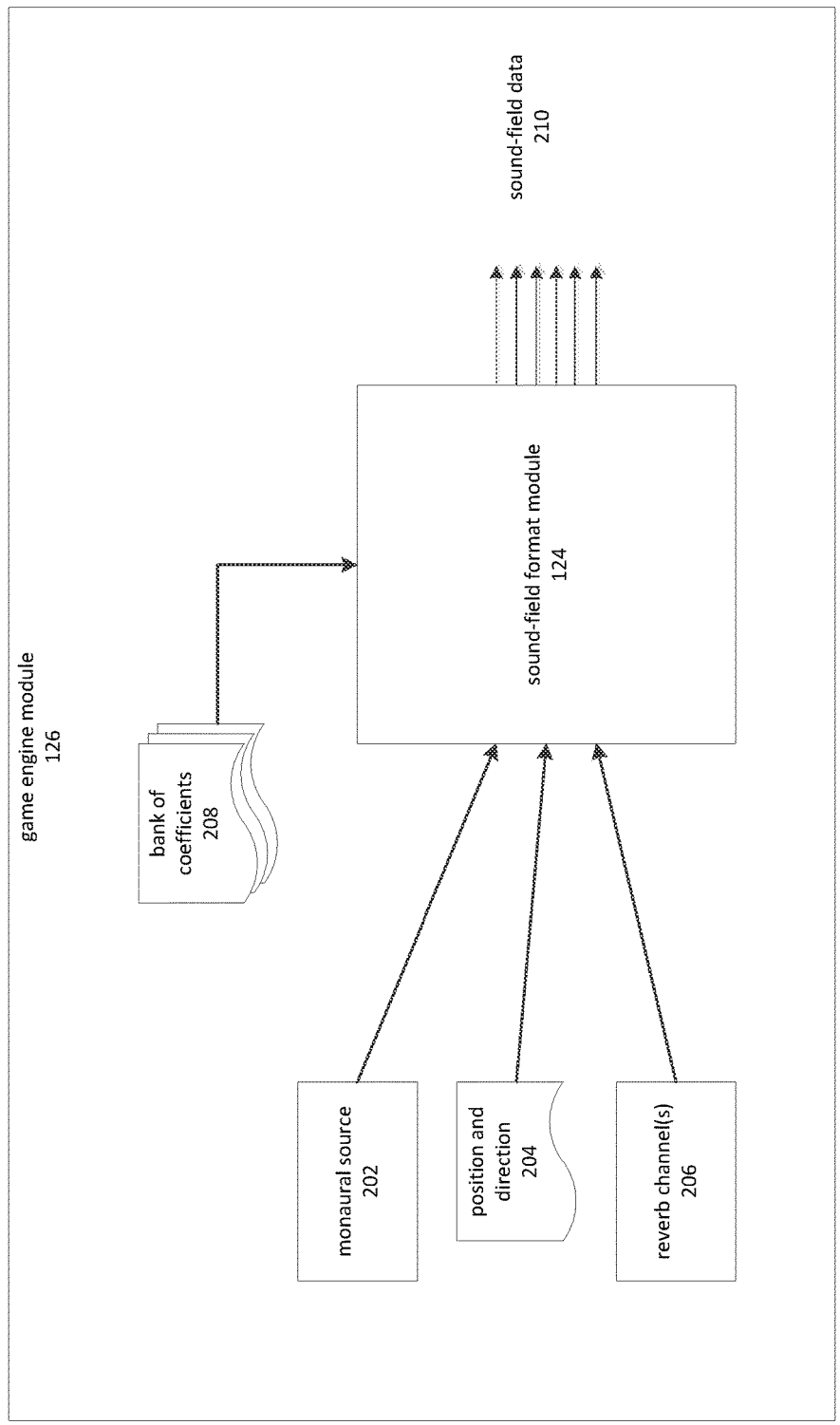
FIG. 2 depicts aspects of an example embodiment of a game engine generating sound-field data.

FIG. 2 depicts aspects of an example embodiment of a game engine generating sound-field data. With reference to FIG. 1, a game engine module 126 may comprise a sound-field format module 124. In an embodiment, the sound field format module 124 may generate sound-field data 210 based on an input monaural source 202, position and direction 204 information, one or more banks of coefficients 208, and a one or more reverb channels 206.

In an embodiment, the monaural source 202 corresponds to a game object. There may be a position and direction 204 associated with the game object. Although not explicitly depicted in FIG. 2, properties such as speed and direction of movement may also be associated with the game object, and used similarly in the generation of sound field data. The monaural source may thus represent one or more sounds generated by the game object, and also be associated with the aforementioned properties.

In an embodiment, one or more reverb channel(s) 206 are summed into the stream in order to provide directional cues. In an embodiment, the reverb channel(s) 206 are uncorrelated.

In an embodiment, one or more banks of coefficients 208 may be applied to the monaural source signal 202 to generate channels of sound-field data 210. In some embodiments, the coefficients 208 may be recalculated or re-estimated each frame. The sound-field format module 124 may apply the coefficients 208 by finding the appropriate bank of coefficients for the specified direction and convolving the monaural source signal 202 using the identified coefficients.

In an embodiment, the sound-field format module 124 may output sound-field data 210 as a set of channels. The number of channels may depend on the degree or order of the sound-field data. For example, if first-order ambisonics are used, the number of channels may consist of 4 channels (W, X, Y, Z). Note that although the term "channel" is used here, it is distinguished from the channels associated with channel-based audio, as that term is used herein. In ambisonics, for example, the channels of the sound-field data refer to the output of a virtual microphone. In contrast, in channel-based audio, as that term is used herein, channels may correspond to speakers, such as the 6 channels in a 5.1 speaker configuration.

Figure 3:
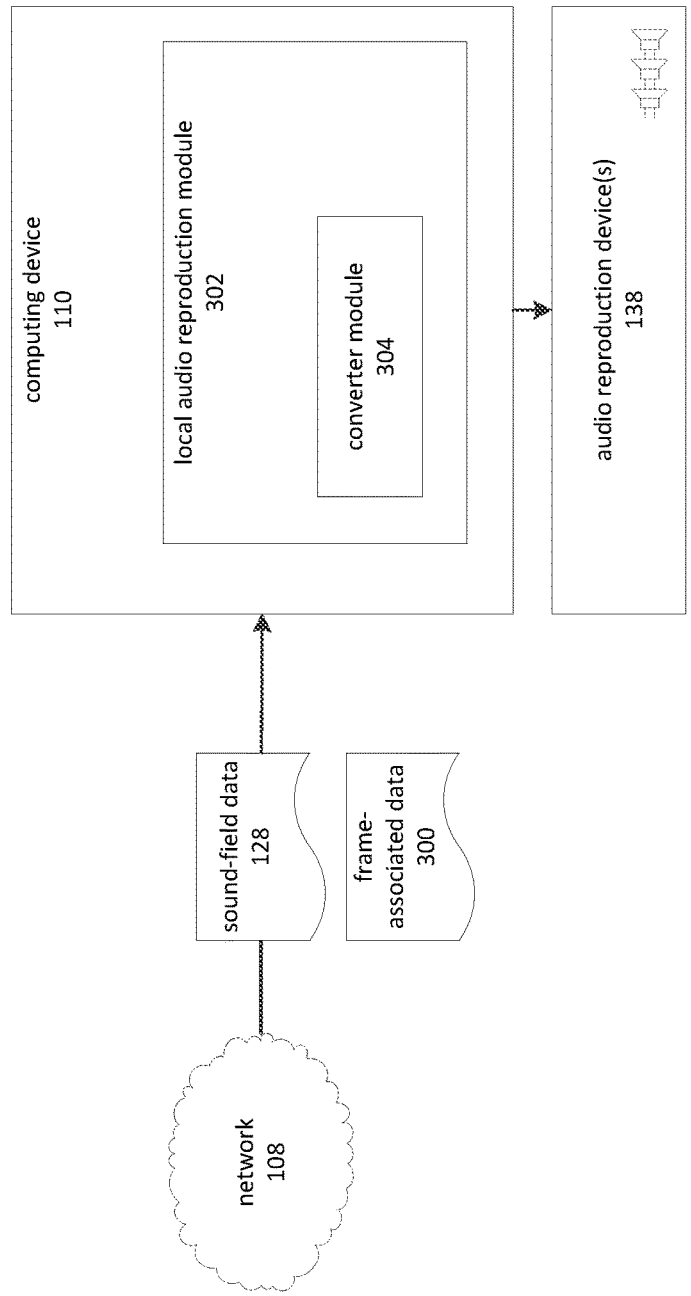
FIG. 3 depicts aspects of an example embodiment of an audio streaming system.

FIG. 3 depicts aspects of an example embodiment of an audio streaming system. Sound-field data 128 may be transmitted via the network 108 to a computing device 110. With reference to FIG. 1, a destination computing device 110 may be remote to a source computing device 102 on which the sound-field data 128 was generated.

The sound-field data 128 may be associated with frames of content. For example, a game engine module 126 running on a source computing node 102 may generate frames of video content. The game engine module 126 may also generate audio data associated with each frame. In an embodiment, the sound-field data 128 may be accompanied by frame-associated data 300. In an embodiment, the frame-associated data 300 may comprise data that may be used to convert sound-field data 128 to another audio format. In an embodiment, the frame-associated data may include information indicative of position, direction, and distance of a virtual listener as of a certain frame of content. In an embodiment, the frame-associated data may contain metadata pertinent to the sound-field data, such as an indication of whether the sound-field data is $N^{th}$ order, $N^{th}+1$ order, etc. In an embodiment, the frame-associated data may comprise synchronization information.

In an embodiment, the computing device 110 may receive the sound-field data 128 and provide it to a local audio reproduction module 302. The local audio reproduction module 302, having received the sound-field data, may convert the sound-field data to an audio format compatible with the audio reproduction device(s).

The local audio reproduction module 302 may cause the sound-field data 128 to be processed by a converted module 304. The converter module 304 may convert or transcode the sound-field data 128 to another audio format, including but not limited to channel-based audio or object-based audio.

In an embodiment, the converter module may perform the conversion or transcoding based at least in part on the frame-associated data. For example, the conversion or transcoding may be performed with reference to properties such as the position, speed, and direction a virtual listener within the sound field.

Figure 4:
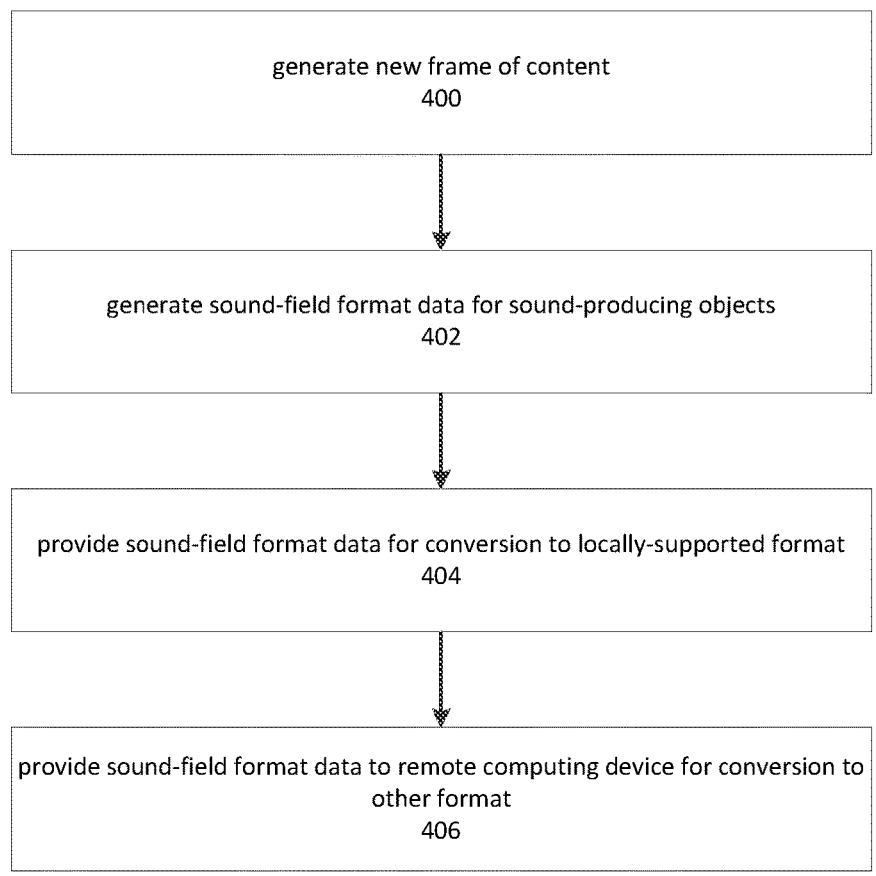
FIG. 4 depicts an example process of generating content comprising sound-field information.

FIG. 4 depicts an example process of generating content comprising sound-field information. Although depicted as a series of blocks, the depicted order should not be viewed as limiting the scope of the present disclosure. Except where explicitly indicated or logically required, the depicted blocks represent operations that may be rearranged, performed in parallel, or, in some cases, omitted.

In an embodiment, the operations depicted by FIG. 4 may be performed by a game engine module during the generation of game content. At block 400, the game engine module may generate a new frame of content. This may, for example, comprise calculating and updating the positions of various game objects. Certain of these objects may be sound-producing, or cause sounds to be produced at various positions in the game's virtual environment. Block 402 depicts generating sound-field format data for each of these sound-producing objects. In an embodiment, the sound-field data for each object is further combined into a single sound-field. In an embodiment, the sound-field data is generated by the game engine module.

Block 404 depicts converting the sound-field to a locally-supported audio format. In an embodiment, the game engine module provides the sound-field data to an audio platform module, which may receive the data and in turn provide it to a local audio reproduction module. The local audio reproduction module may then generate an audio signal for playback on an audio reproduction device. In other embodiments, the game engine module may form audio data in another format which is then transcoded to a sound-field format.

Block 406 depicts that the game engine module may also provide the sound-field information to a remote computing device. In an embodiment, the game engine module may provide the information to a local audio platform module, which in turn provides the sound-field information to the remote computing device.

The sound-field information information may be provided to a remote computing device via a network or game streaming platform. The remote computing device may then reproduce the audio using whatever speaker configurations and spatialization technologies are locally available.

Figure 5:
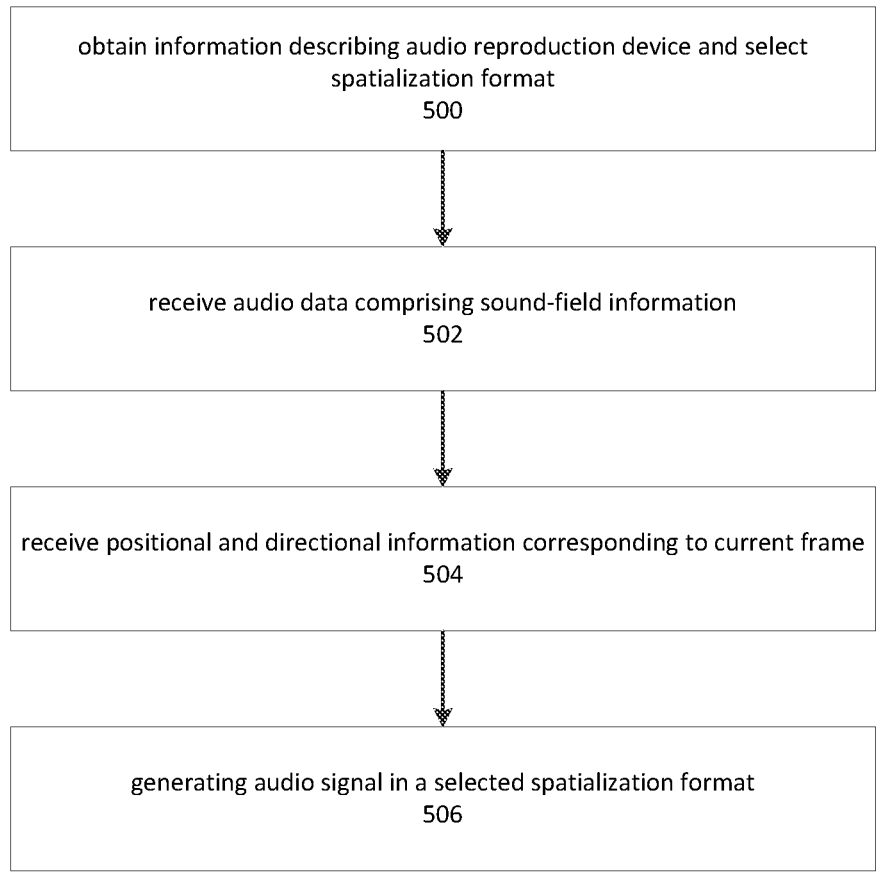
FIG. 5 depicts an example process of converting sound-field information to an audio signal of a selected spatialization format.

FIG. 5 depicts an example process of converting sound-field information to an audio signal of a selected spatialization format. Although depicted as a series of blocks, the depicted order should not be viewed as limiting the scope of the present disclosure. Except where explicitly indicated or logically required, the depicted blocks represent operations that may be rearranged, performed in parallel, or, in some cases, omitted.

In an embodiment, the operations depicted by FIG. 5 may be performed by a computing device which receives generated content via a network and/or a game streaming platform. The operations may, for example, be performed by a local audio reproduction module, such as the local audio reproduction module 302 depicted by FIG. 3.

Block 500 depicts the local audio reproduction module obtaining information pertaining to the configuration of an audio device on which the sound is to be reproduced, and selecting or identifying a suitable spatialization format. For example, a DOLBY ATMOS configuration might be selected if a suitable speaker configuration is available for use, while two-channel audio and HRTF might be selected if suitable headphones are available.

Block 502 depicts receiving audio data that comprises sound-field information. In an embodiment, the sound-field information is received as a stream of data. Portions of the stream may be associated with corresponding frames of content generated by the source of the stream.

As depicted by block 504, the computing device may receive positional and directional information corresponding to the current frame. In an embodiment, the positional and directional information may identify a position of a virtual listener, such that the decoding may be relative to a variable position within the sound field.

Block 506 depicts generating an audio signal in the selected spatialization format. In an embodiment, the generation of the signal may proceed as described in relation to FIG. 3.

Figure 6:
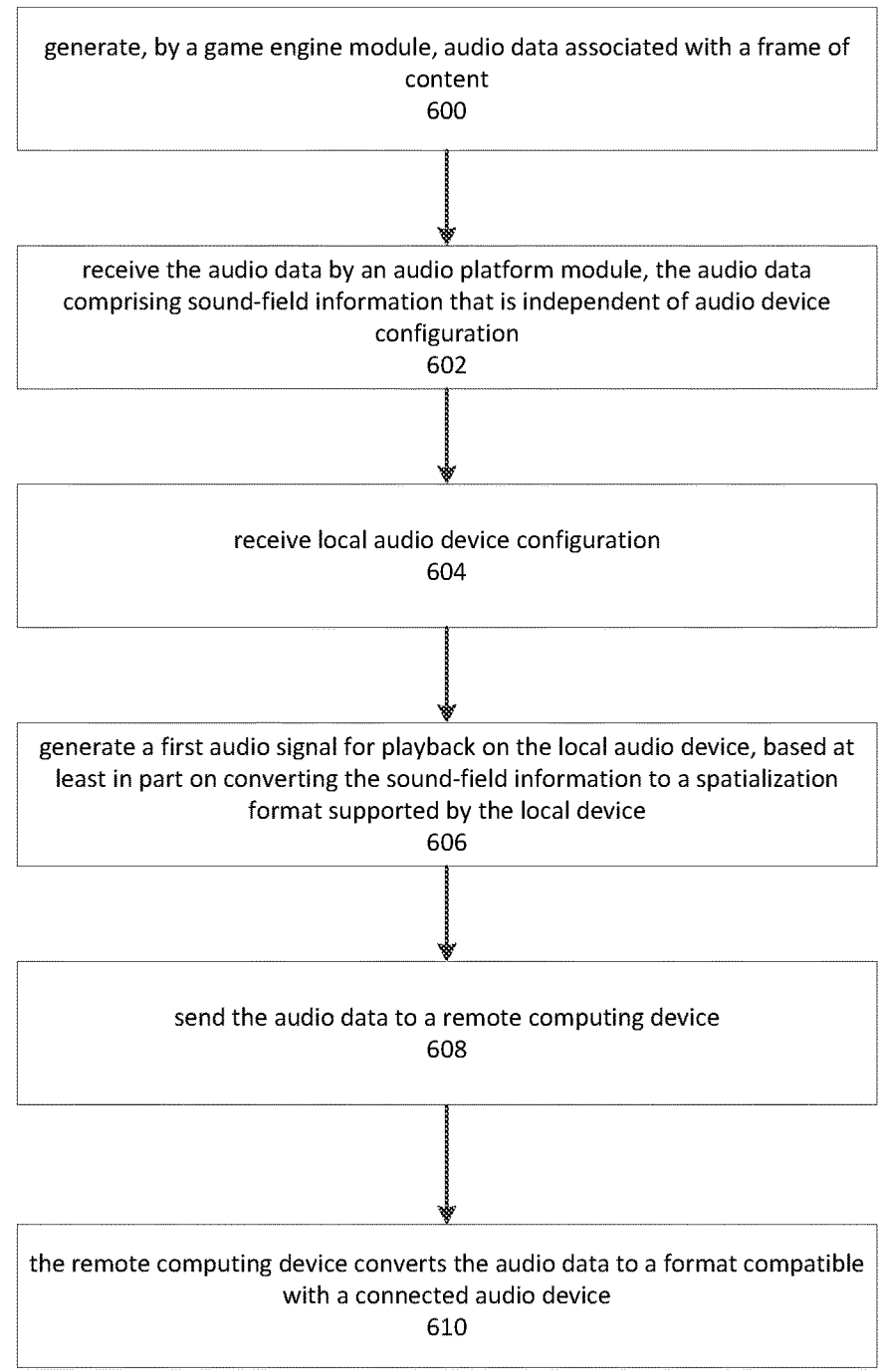
FIG. 6 depicts an example process of streaming spatial audio.

FIG. 6 depicts an example process of streaming spatial audio. Although depicted as a series of blocks, the depicted order should not be viewed as limiting the scope of the present disclosure. Except where explicitly indicated or logically required, the depicted blocks represent operations that may be rearranged, performed in parallel, or, in some cases, omitted.

Block 600 depicts generating, by a game engine module, audio data associated with a frame of content. In an embodiment, the audio data is generated based on one or more monaural signals of audio data. A monaural signal may correspond to a game object or in-game event. The object or event may be associated with properties such as direction, elevation, and distance, which may vary with each frame of content.

The audio data, comprising sound-field information, may be generated by a transformation of the monaural signal in view of a position of the object, its direction of movement, and/or its facing. The audio data may also include one or more reverb channels providing directional cues usable in subsequent conversions.

In an embodiment, output of a virtual microphone is derivable from the sound-field information of the audio data. The position of the virtual microphone may, in some cases, be an arbitrary location within the sound field. In an embodiment, a virtual microphone is derived based on a position of a game object, such as a game player or game spectator.

Block 602 depicts receiving the audio data by an audio platform module, where the audio data comprises sound-field information independent of audio device configuration. As indicated here, the sound-field information is independent of speaker configuration. In an embodiment, the sound-field information is indicative of a sound pressure level at a point in an n-dimensional space, i.e. the sound-field. In an embodiment, the sound-field information may be represented as ambisonic data.

Block 604 depicts receiving information indicative of the configuration of a local audio device, which may include information indicative of available spatialization technologies and speaker configuration. In some instances, the listener may provide input to indicate a preference for spatialization technology. In other instances, a preferred format may be automatically selected based on available spatialization technologies and the available speakers.

Block 606 depicts generating an audio signal for playback on the local audio device. The audio signal may be generated based at least in part on converting the sound-field information to a spatialization format that is supported by the local device.

Block 608 depicts sending the audio data, comprising the sound-field information, to a remote computing device. The sending may comprise transmitting the data through a network directly or indirectly to the computing device. The data may, for example, be sent through a streaming service.

As depicted by block 610, the remote computing device may obtain the audio-data and generate an audio signal for playback on an audio device connected to the remote computing device. The playback on the computing device may use a spatialization technology and speaker configuration different than those used by the computing device that generated the content. For example, the source of the content might have played audio using a channel-based format, while the remote computing device might employ an object based format.

Figure 7:
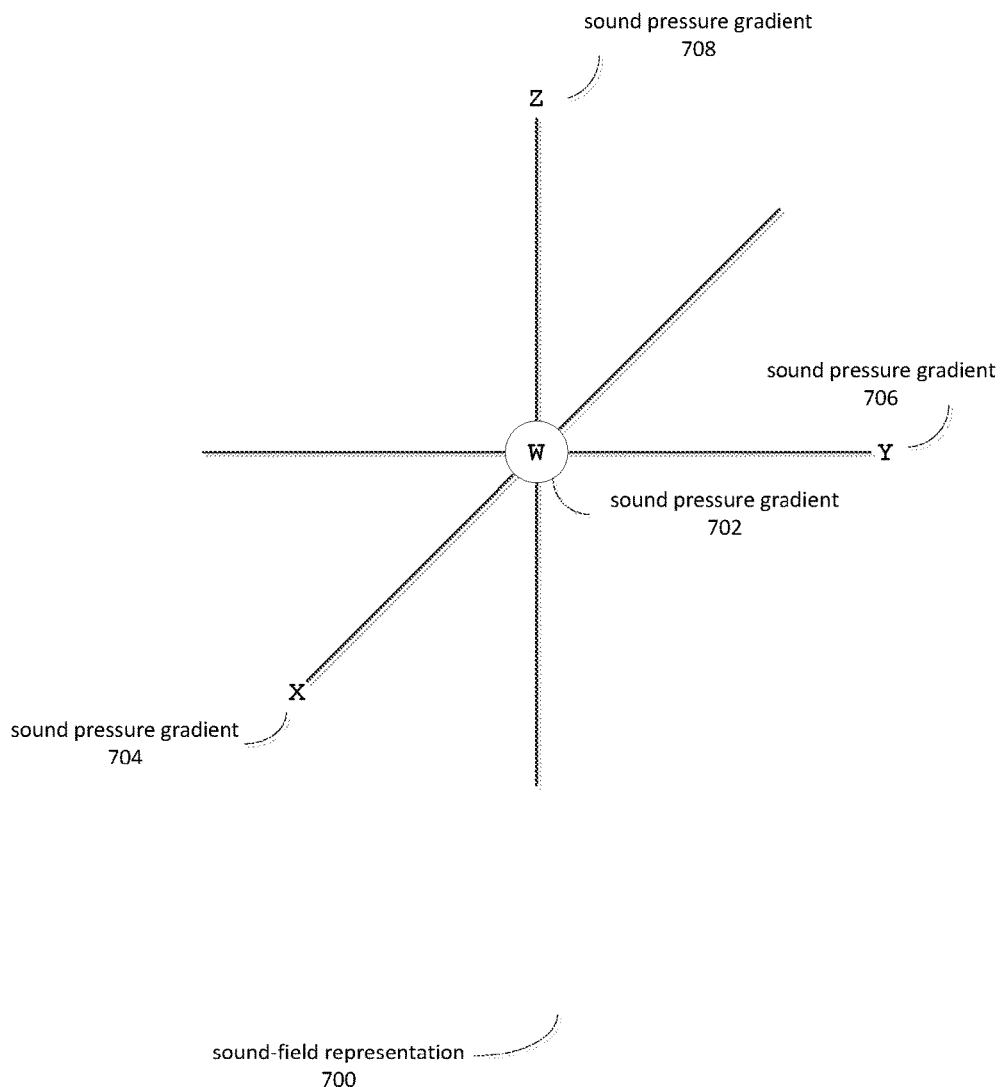
FIG. 7 depicts an example of a sound-field representation.

FIG. 7 depicts an example of a sound-field representation. A sound-field representation 700 may comprise representations of a central sound pressure gradient 702. In an embodiment, this may correspond to a signal captured by a real or virtual omnidirectional microphone. The sound field representation may further comprise representations of sound field gradients 704, 706, 708 in the X, Y, and Z directions. In other words, a sound-field representation 700 may comprise an omnidirectional component and additional directional components in three dimensions. In an embodiment, the sound-field representation may comprise a four-channel signal, though as noted herein this type of channel is distinguished from conventional speaker channels. In an embodiment, the sound-field representation 700 may comprise ambisonics, such as an ambisonic b-format representation. In an embodiment, a higher-order sound-field representation, such as a higher-ordered ambisonic format, is used. In embodiments, sound-field data may be represented using spherical harmonics techniques.

Figure 8:
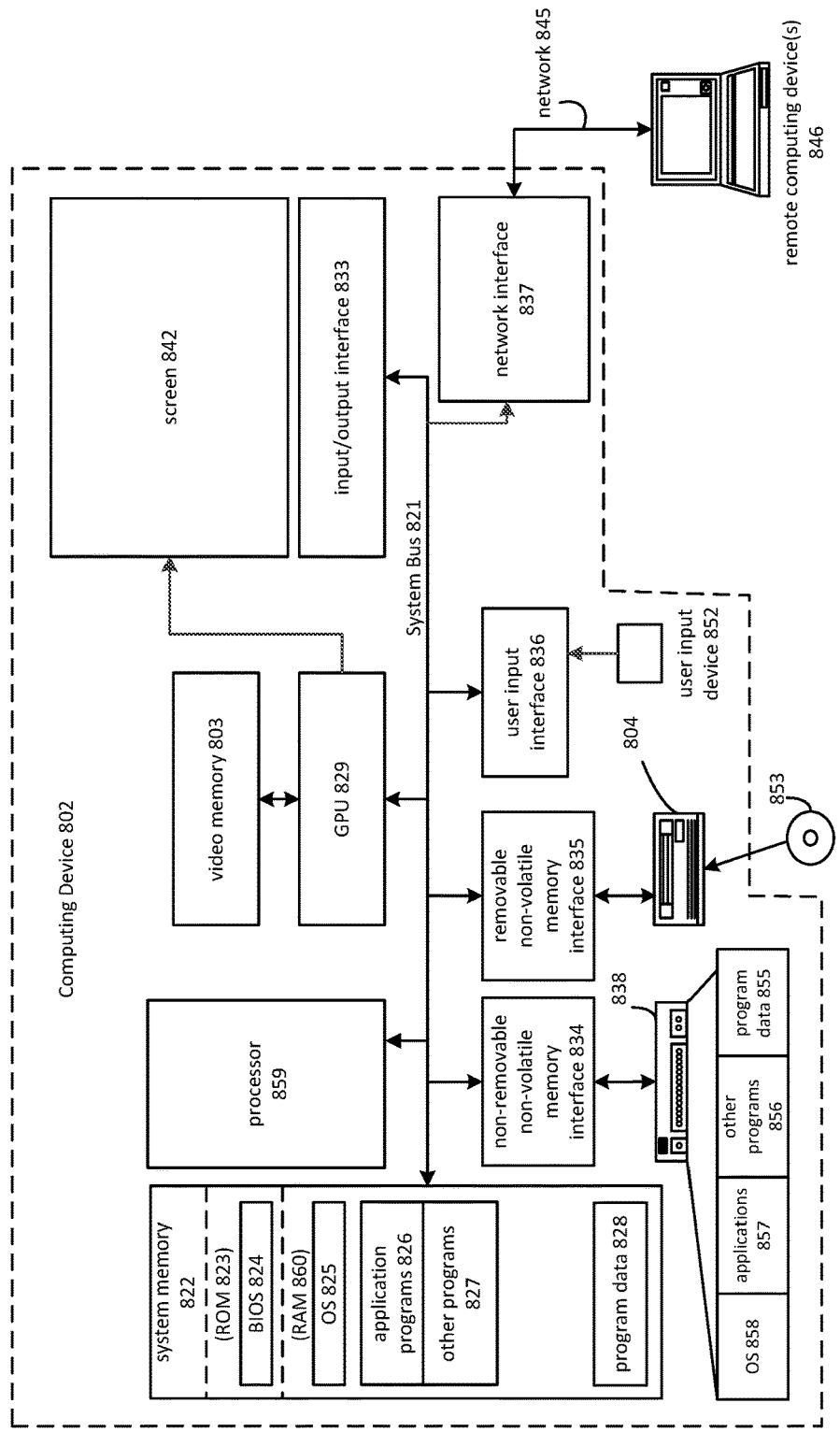
FIG. 8 depicts an example general purpose computing environment in which in which the techniques described herein may be embodied.

Aspects of the present disclosure may be implemented on one or more computing devices or environments. FIG. 8 depicts an example computing environment in which in which some of the techniques described herein may be embodied. The computing device 802 is only one example of a suitable computing environment and is not intended to suggest any limitation as to the scope of use or functionality of the presently disclosed subject matter. Neither should the depiction of the computing environment be interpreted as implying any dependency or requirement relating to any one or combination of components illustrated in the example computing device 802. In some embodiments the various depicted computing elements may include circuitry configured to instantiate specific aspects of the present disclosure. For example, the term circuitry used in the disclosure can include specialized hardware components configured to perform function(s) by firmware or switches. In other example embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computing device 802, which may include any of a mobile device, smart phone, tablet, laptop, desktop computer, etc., typically includes a variety of computer-readable media. Computer-readable media can be any available media that can be accessed by computing device 802 and may include both volatile and nonvolatile media, removable and non-removable media. Media and computer readable media are physical mediums and as such do not include propagating signals per se or transitory signals per se.

The system memory 822 includes computer-readable storage media in the form of memory such as read only memory ("ROM") 823 and random access memory ("RAM") 860. The RAM memory 860 may include volatile memory modules, such as dual in-line memory modules ("DIMMs"). The RAM 860 portion of system memory 822 may sometimes be referred to as main memory. RAM 860 typically contains data and/or program modules that are immediately accessible to and/or presently being operated on by processor 859. By way of example, and not limitation, FIG. 8 illustrates operating system 825, application programs 826, other program modules 827, and program data 828.

The processor 859 typically contains at least one primary processing unit, sometimes referred to as a core, and at least one system agent, sometimes referred to as an uncore. The core of the processor 859 typically executes computer-executable instructions while the uncore performs related tasks which may include overseeing memory transfers and maintaining a processor cache. The uncore may comprise a memory controller for interfacing between cores of the processor 859 and system memory 822.

A basic input/output system 824 ("BIOS"), containing the basic routines that help to transfer information between elements within computing device 802, such as during start-up, is typically stored in ROM 823. The BIOS 824 may be replaced, in various embodiments, by other firmware.

The computing device 802 may also include non-volatile storage devices. By way of example only, FIG. 8 illustrates a hard disk drive 838 that reads from or writes to non-removable, non-volatile magnetic media, and an optical disk drive 814 that reads from or writes to a removable, non-volatile optical disk 853 such as a CD ROM or other optical media. Other non-volatile storage devices that can be used in the example operating environment include, but are not limited to, flash memory, digital versatile disks, solid state disk drives, and the like. The hard disk drive 838 is typically connected to the system bus 821 through an non-removable memory interface such as interface 834, and optical disk drive 804 is typically connected to the system bus 821 by a removable memory interface, such as interface 835.

The drives and their associated computer storage media discussed above and illustrated in FIG. 8, provide storage of computer-readable instructions, data structures, program modules and other data for the computing device 802. In FIG. 8, for example, hard disk drive 838 is illustrated as storing instructions of the operating system 858, application programs 857, other program modules 856, and program data 855. Note that these components can either be the same as or different from operating system 825, application programs 826, other program modules 827, and program data 828. Operating system 858, application programs 857, other program modules 856, and program data 855 are given different numbers here to illustrate that, at a minimum, they are different copies. A user may enter commands and information into the computing device 802 through a user input device 852. The user interface device 852 may include, but is not limited to, keyboards, touchpads, computer mice, trackballs, and so forth. Other input devices, also not shown, may include a microphone, joystick, game pad, satellite dish, scanner, or the like. These and other input devices are often connected to the processing unit 859 through a user input interface 836 that is coupled to the system bus, but may be connected by other interface and bus structures, such as a parallel port, game port or a universal serial bus (USB). A screen 842 or other type of display device is also connected via GPU 829, although in some instances the screen 842 may be driven through the system bus 821 or another interface. In addition to the monitor, computers may also include other peripheral input/output devices such as speakers, printers, and so forth which may be connected through an input/output interface 833.

The computing device 802 may operate in a networked environment using logical connections to one or more remote computers, such as a remote computer 846. The remote computer 846 may be a personal computer, a server, a router, a network PC, a peer device or other compute node, and typically includes many or all of the elements described above relative to the computing device 802. The connections depicted in FIG. 8 include a network 845, which may include local-area, wide-area, cellular, and mesh networks, or other types of networks.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Each of the processes, methods and algorithms described herein may be embodied in, and fully or partially automated by, modules comprising computer executable instructions loaded into memory and executed by one or more processors of a computing device. The processes and algorithms may also be implemented wholly or partially in application-specific circuitry. The results of the disclosed processes and process steps may be stored, persistently or otherwise, in any type of computer storage device such as, e.g., volatile or non-volatile storage. Volatile and non-volatile storage, as used herein, excludes propagating or transitory signals per se.

The various features and processes described herein may be used independently of one another, or may be combined in various ways. All possible combinations and subcombinations are intended to fall within the scope of this disclosure. In addition, certain elements of the processes, methods, and algorithms may be omitted in some implementations. The methods and processes described herein are also not limited to any particular sequence, and the depictions comprising blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

The embodiments presented herein are so presented by way of example, and are not intended to limit the scope of the present disclosure. Thus, nothing in the foregoing description is intended to imply that any particular feature, characteristic, step, module or block is required, necessary, or indispensable. The methods and systems described herein may be embodied in a variety of forms. Various omissions, substitutions and changes in the form of the methods and systems described herein may be made without departing from the spirit of what is disclosed herein. The accompanying claims and their equivalents are intended to cover such forms or modifications as would fall within the scope and spirit of certain embodiments disclosed herein.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A computer-implemented method, comprising:
generating a monaural audio stream data associated with a game object, the game object associated with a frame of content;
generating audio data associated with the frame of content, comprising sound-field information based at least in part on the monaural audio stream and a position of the object in the frame of content;
processing, at a first computing device, the audio data to convert the audio data to a first audio signal in a first spatialization format compatible with a first audio device; and
sending the audio data to a remote computing device over a network, wherein the remote computing device processes and converts the audio data to a second audio signal in a second spatialization format compatible with a second audio device.

2. The computer-implemented method of claim 1, wherein the sound-field information comprises audio at a location in the sound-field corresponding to the position of the object in the frame of content.

3. The computer-implemented method of claim 1, wherein the sound-field information is speaker-independent.

4. The computer-implemented method of claim 1, wherein the sound-field information comprises directional information.

5. The computer-implemented method of claim 1, wherein the first spatialization format is channel-based and the second spatialization format is object-based.

6. The computer-implemented method of claim 1, further comprising:
receiving information indicative of a speaker configuration of the first audio device; and selecting the first spatialization format based at least in part on the speaker configuration.

7. The computer-implemented method of claim 1, wherein the audio data is generated independently of a speaker configuration of the second audio device.

8. The computer-implemented method of claim 1, further comprising:
generating the sound-field information based at least in part on at least one of direction, elevation, or distance of the game object associated with the frame of content.

9. The computer-implemented method of claim 1, wherein audio playback by the second audio device is based at least in part on a head-related transfer function.

10. A system comprising:
at least one processor;
a memory having stored thereon instructions that, when executed by the at least one processor, cause the system to:
generate a monaural audio stream data associated with a game object, the game object associated with a frame of content;
generate audio data associated with the frame of content, comprising sound-field information based at least in part on the monaural audio stream and a position of the object in the frame of content;
process the audio data to convert the audio data to a first audio signal in a first spatialization format compatible with a first audio device; and
send the audio data to a remote computing device over a network, wherein the remote computing device processes and converts the audio data to a second audio signal in a second spatialization format compatible with a second audio device.

11. The system of claim 10, wherein the sound-field information comprises audio at a location in the sound-field corresponding to the position of the object in the frame of content.

12. The system of claim 10, wherein the sound-field information is speaker-independent.

13. The system of claim 10, wherein the sound-field information comprises directional information.

14. The system of claim 10, wherein the first spatialization format is channel-based and the second spatialization format is object-based.

15. The system of claim 10, wherein the memory has further instructions stored thereon to:
receive information indicative of a speaker configuration of the first audio device; and
select the first spatialization format based at least in part on the speaker configuration.

16. The system of claim 10, wherein the audio data is generated independently of a speaker configuration of the second audio device.

17. The system of claim 10, wherein the memory has further instructions stored thereon to:
generate the sound-field information based at least in part on at least one of direction, elevation, or distance of the game object associated with the frame of content.

18. system of claim 10, wherein audio playback by the second audio device is based at least in part on a head-related transfer function.

19. A non-transitory computer readable storage medium having stored thereon instructions that, upon execution by a computing device, cause the computing device to at least:
generate a monaural audio stream data associated with a game object, the game object associated with a frame of content;
generate audio data associated with the frame of content, comprising sound-field information based at least in part on the monaural audio stream and a position of the object in the frame of content;

process the audio data to convert the audio data to a first audio signal in a first spatialization format compatible with a first audio device; and send the audio data to a remote computing device over a network, wherein the remote computing device processes and converts the audio data to a second audio signal in a second spatialization format compatible with a second audio device.

20. The non-transitory computer readable storage medium of claim 19, wherein the sound-field information comprises audio at a location in the sound-field corresponding to the position of the object in the frame of content.

\* \* \* \* \*